United States Patent [19]
Fitzpatrick et al.

[11] Patent Number: 6,046,750
[45] Date of Patent: Apr. 4, 2000

[54] METHOD AND APPARATUS FOR CONTROLLING PRESENTATIONS OF OBJECTS ON A USER INTERFACE OF A DATA PROCESSING SYSTEM

[75] Inventors: Greg P. Fitzpatrick; Abdolreza Salahshour, both of Keller; Marvin L. Williams, Lewisville, all of Tex.

[73] Assignee: International Business Machines Corporation, Armonk, N.Y.

[21] Appl. No.: 08/083,242

[22] Filed: Jun. 25, 1993

[51] Int. Cl.$^7$ ................................................. G06F 15/00
[52] U.S. Cl. ........................................................ 345/440
[58] Field of Search ................................... 345/118, 133, 345/155, 161, 440, 333, 334, 335

[56] References Cited

U.S. PATENT DOCUMENTS

| | | | |
|---|---|---|---|
| 4,788,538 | 11/1988 | Klein et al. .............................. | 340/747 |
| 5,247,611 | 9/1993 | Norden-Paul et al. .................. | 395/161 |
| 5,263,129 | 11/1993 | Ikegaya .................................... | 395/118 |
| 5,271,097 | 12/1993 | Barker et al. ............................ | 395/135 |

OTHER PUBLICATIONS

*Graphical Slide Projector*, Nov., 1990, Authors: Dickson.
Christodoulakis et al. "Browsing Within Time–Driven Multimedia Doc'ts", Conference on Automation Systems, Mar. 1988, pp. 219–227.

Berry, "The Designer's Model of the CUA Workplace" IBM System Journal, vol. 31, No. 3, 1992, pp. 432–436.

Gray et al. "Do–It–Yourself Iconic" Proceedings of IFIP Conference on Human–Computer Interaction, 1990 pp. 639–644.

*Graphical Slide Projector*, Nov. 1990, Authors: Dickson et al., IBM Document No. AAA90A064129.

*Primary Examiner*—Phu K. Nguyen
*Attorney, Agent, or Firm*—Geoffrey A. Mantooth

[57] ABSTRACT

Objects on a data processing system are provided to a multimedia presentation device for presentation purposes. Each object is provided with one or more attributes. These attributes are registered before the presentation. When an object is selected for presentation, the object is transformed into a presentable format in accordance with its attributes. Such attributes include whether the object is restricted for display, the particular presentation device or devices that will present the object, the types of transforms to be performed on the object to ready the object for presentation, whether the object should be segmented into plural segments and if so, then the manner in which the segments are presented. After the transformation, the object is provided to the appropriate presentation device.

18 Claims, 6 Drawing Sheets

METHOD AND APPARATUS FOR CONTROLLING PRESENTATIONS OF OBJECTS ON A USER INTERFACE OF A DATA PROCESSING SYSTEM

TECHNICAL FIELD OF THE INVENTION

The present invention relates to methods and apparatuses for providing multimedia presentations using user interfaces of data processing systems.

BACKGROUND OF THE INVENTION

Multimedia presentations are becoming more prevalent in office meetings. Meeting rooms equipped with multimedia devices can typically contain an overhead projector, an electronic transparency device located on the overhead projector, a computer connected to the electronic transparency device, microphones, etc.

The computer provides a desktop, or a user interface, for a person presenting information in the meeting room. The information which is to be presented to the audience is represented on the desktop as one or more objects. The desktop may contain additional information in the form of objects that are not meant to be presented to the audience in a meeting room. For example, the additional information may be of a confidential nature. Also, the additional information may not be pertinent to the presentation. With prior art techniques, such additional information may be inadvertently displayed, interrupting the presentation.

SUMMARY OF THE INVENTION

It is an object of the present invention to provide a method and apparatus for controlling the desktop objects that will be provided to a presentation device.

The method and apparatus of the present invention present an object in a data processing system. The presentation is with a presentation device. The object is provided with attributes that are relevant to the presentation of the object. Then, it is determined when the object is to be presented. The object is transformed into a displayable format in accordance with the attributes and the transformed object is provided to the presentation device.

In one aspect of the present invention, the determination of when the object is to be presented is made by displaying a representation of the object and a representation of the presentation device on a user interface of the data processing system and then determining if the object representation is associated with the presentation device representation.

The present invention provides a mechanism that is cognizant of an object, and its attributes, which object is provided to a presentation device. A registration service allows a user to define the attributes of an object. Such attributes include whether the object is restricted for display, the particular presentation device or devices that will present or display the object, the types of transforms to be performed on the object to ready the object for presentation by the presentation device, whether the object should be segmented into plural segments and if so then the manner in which the segments are presented (that is the segments are either automatically or manually changed).

Once the object is registered, it can then be presented. Presentation of the object includes processing the object so that when the object is passed to the presentation device, the object will be presented in accordance with its attributes. In this manner, the object can be presented by a wide variety of presentation devices, independently of the unique characteristics of those presentation devices. The object is transformed into a displayable format in accordance with its attributes. The transformed object is then provided to the presentation device for presentation.

BRIEF DESCRIPTION OF THE DRAWINGS

FIGS. 3–4c are flow charts showing the method of the present invention, in accordance with a preferred embodiment.

DESCRIPTION OF THE INVENTION

Figure 1:
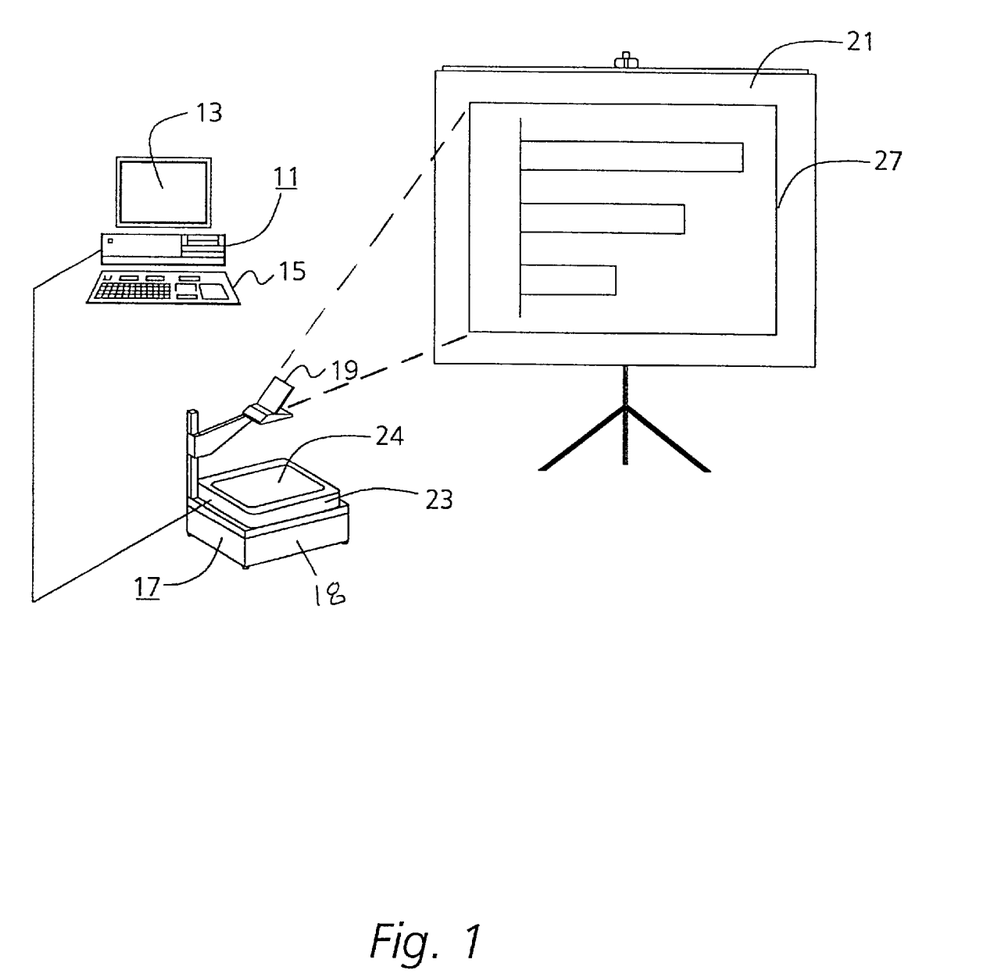
FIG. 1 is a schematic diagram of a preferred embodiment of a presentation system on which the present invention can be practiced.

In FIG. 1, there is shown a schematic diagram of a data processing system 11, upon which the present invention can be practiced. The data processing system is an individual computer 11 workstation. The computer 11 may operate in a stand alone environment or be linked to other computers by a network or other communications link. The computer includes a user interface, which has a display screen 13 and a keyboard 15. The computer contains a storage device such as one or more disk drives for either hard or floppy disks.

The computer is connected to one or more multimedia presentation devices 17. In FIG. 1, a conventional overhead projector 18 is shown as the presentation device. The overhead projector 18 typically contains a light source that shines through a transparent top window. A focusing device 19 focuses the light onto a projection screen 21 for viewing by an audience.

The top window of the overhead projector 18 receives either transparencies or an electronic transparency device 23, either one of which provide images for projection onto the projection screen 21. In the present invention, transparencies are not used. Instead, an electronic transparency device 23 produces the images electronically. The images are produced on a transparency screen 24. The light from the overhead projector passes through the transparency screen 24, wherein the electronically generated images are projected onto the projection screen 21. The electronic transparency device 23 allows the projected images to be changed. Such electronic transparency devices 23 are conventional and commercially available. An example of one such device is sold under the trademark Barco.

The computer 11 is connected to the electronic transparency device 23 through a video adapter card located inside of the computer. The computer provides the electronic images to the electronic transparency device for projection. The electronic transparency device 23 and the overhead projector 18 make up the presentation device 17.

Other types of multimedia presentation devices could be utilized. For example, the presentation device could be a television screen, multiple television screens or a projection television screen. Such presentation devices display video frames. The presentation device need not be visually oriented, but could be audio devices such as speakers.

Figure 2:
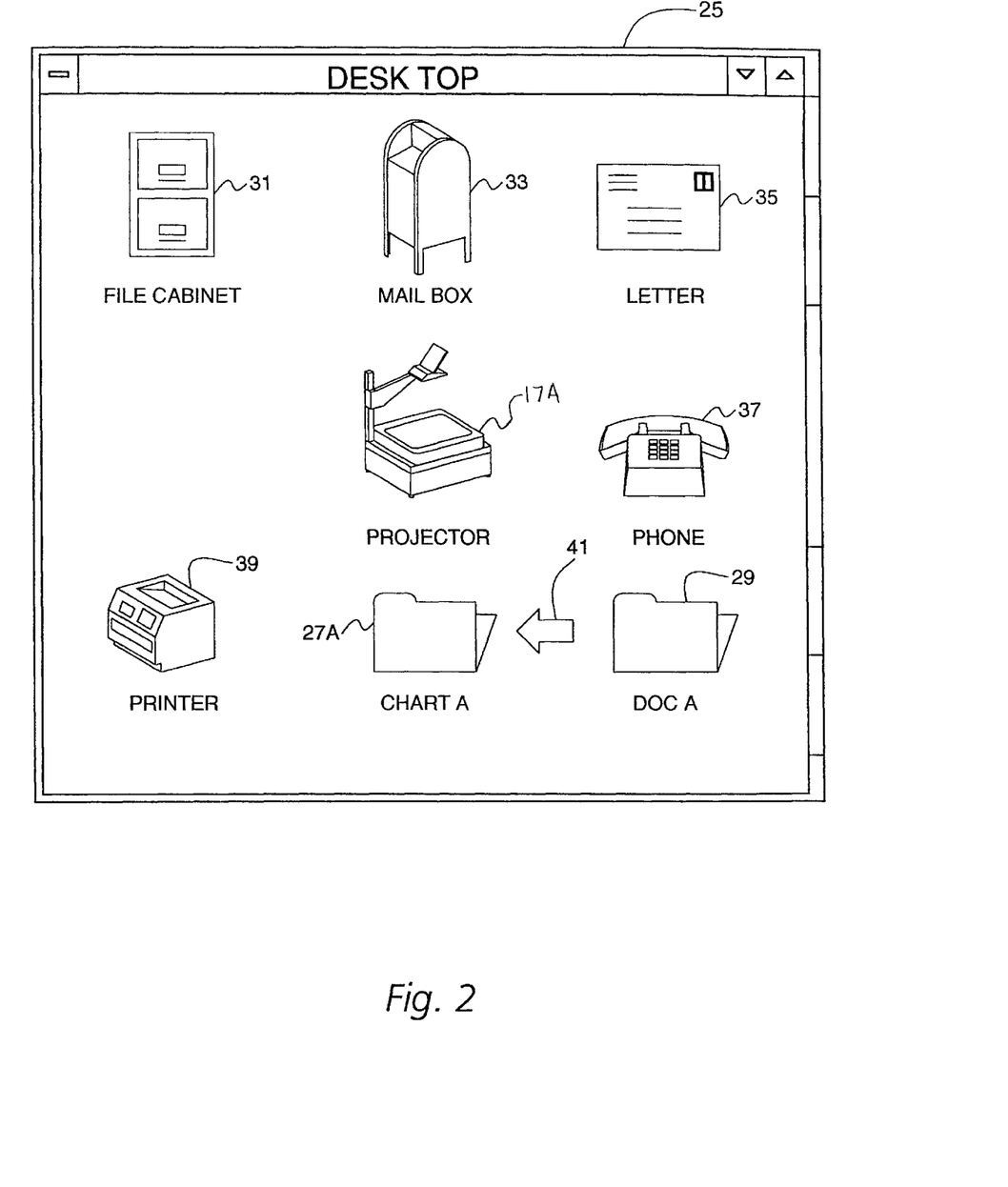
FIG. 2 is a schematic representation of a desktop.

All of the equipment in FIG. 1 may be contained in a meeting room or other appropriate venue. The user, or person making a presentation to the audience, operates the computer 11. On the computer screen 13, a desktop 25 is displayed as shown in FIG. 2. The desktop 25 is a window or panel with plural objects located thereon. The objects are represented as icons. The overhead projector 17 is represented by a projector icon 17A. There is provided an icon 27A for information referred to as Chart A, and an icon 29 for information which is referred to as Doc (document) A. Chart A and Doc A represent objects that are to be displayed to the audience during the presentation. Other icons located on the desktop are: a file cabinet 31 that contains plural files, charts or documents, a mailbox 33, a letter 35, a phone 37 and a printer 39. These latter objects or icons represent information which is not to be displayed to the audience.

The presentation is composed before the actual presentation is made. In addition to creating the objects that are to be presented, composition includes providing attributes for the objects. The method of FIG. 3 provides a registration service for each object that is to be presented.

In order to project chart A onto the projection screen 21, the operator manipulates the Chart A icon 27A on the desktop 25. Using a mouse cursor 41, or other input device, the operator drags the Chart A icon 27A and drops it onto the projector icon 17A. The operator could also inadvertently drag and drop the phone icon 37 onto the projector icon. This action of dropping an icon onto the projector icon invokes the method of FIGS. 4a–4c.

Figure 4A:
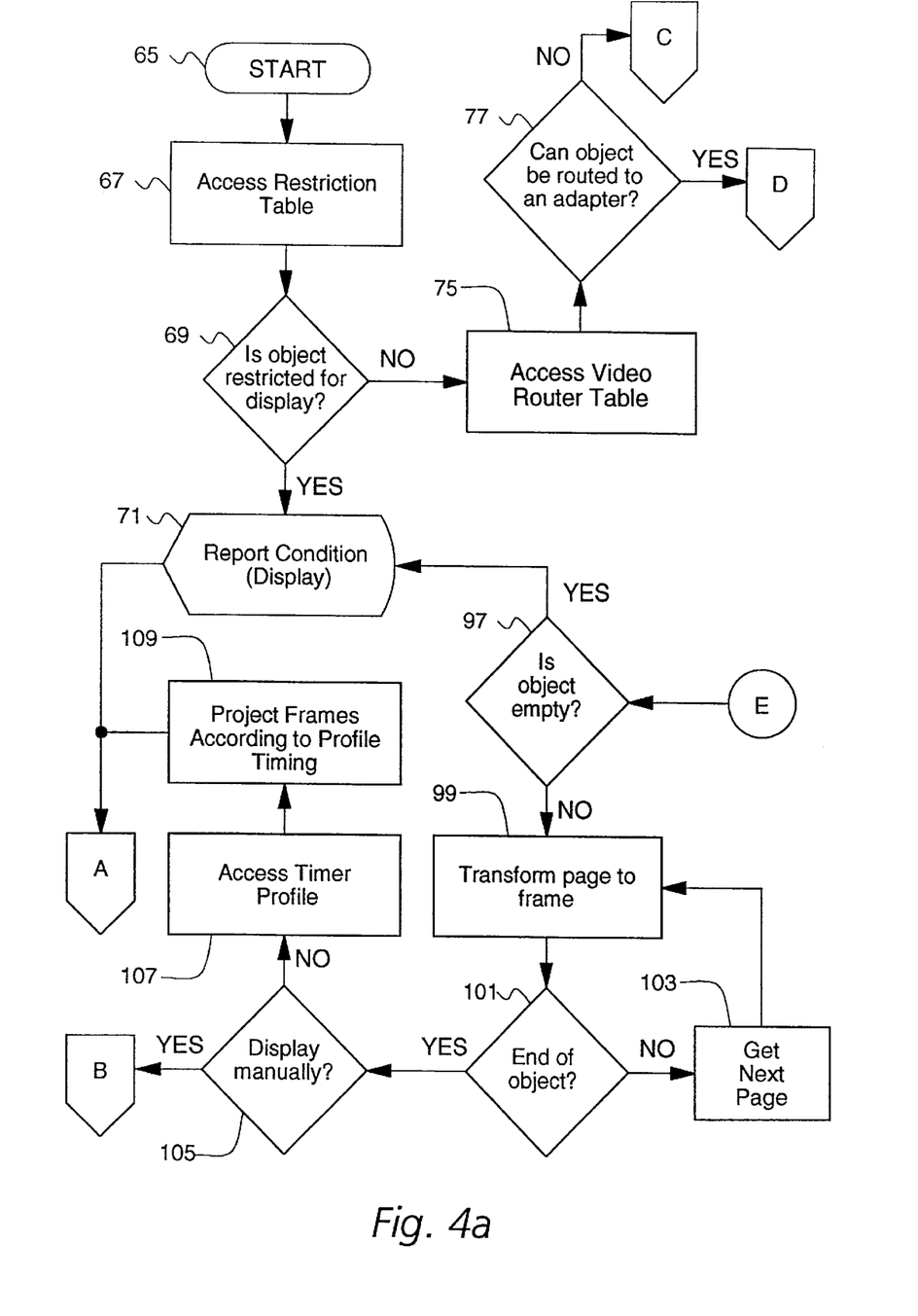
FIGS. 4a–4c show the presentation method.
Figure 4B:
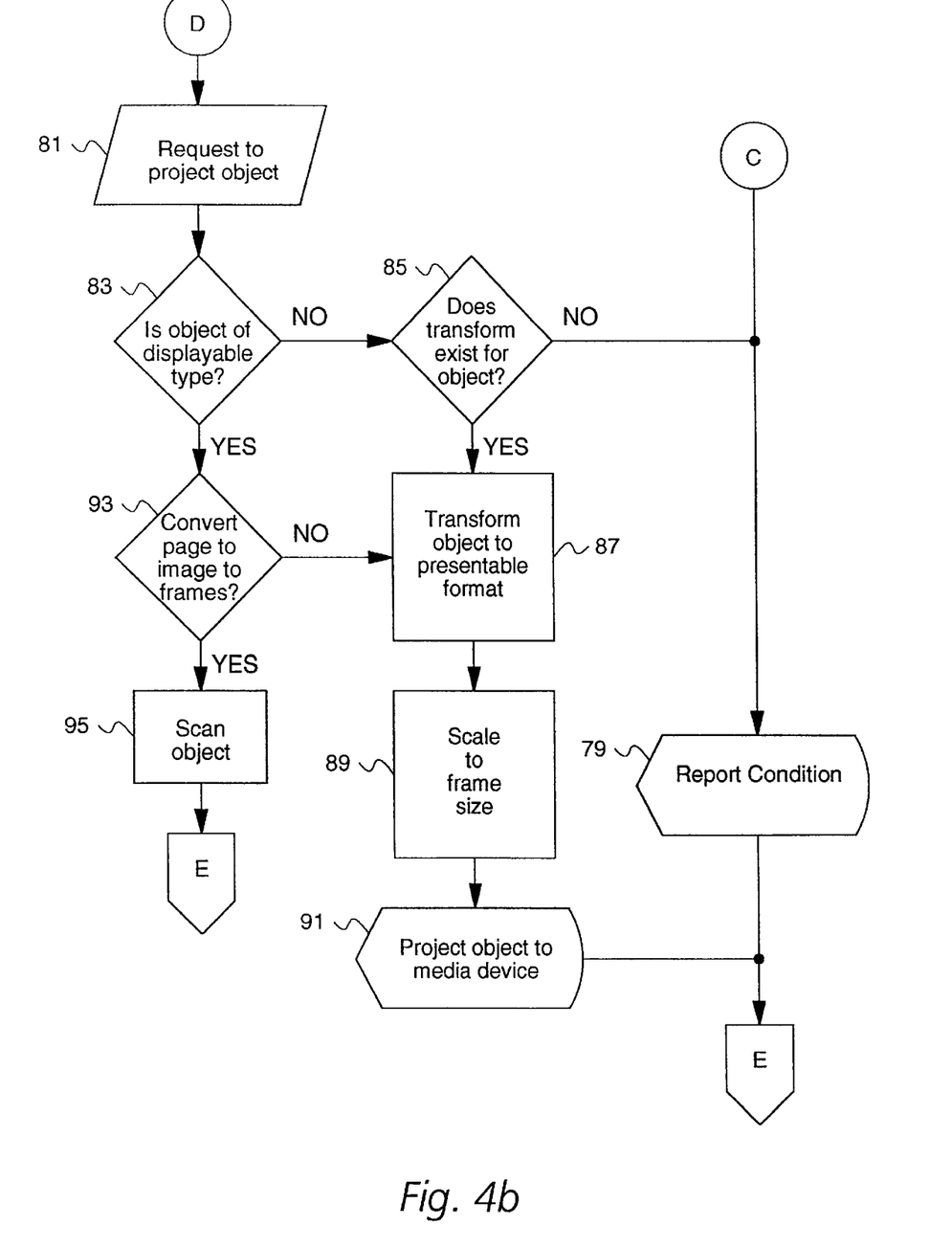
Figure 4C:
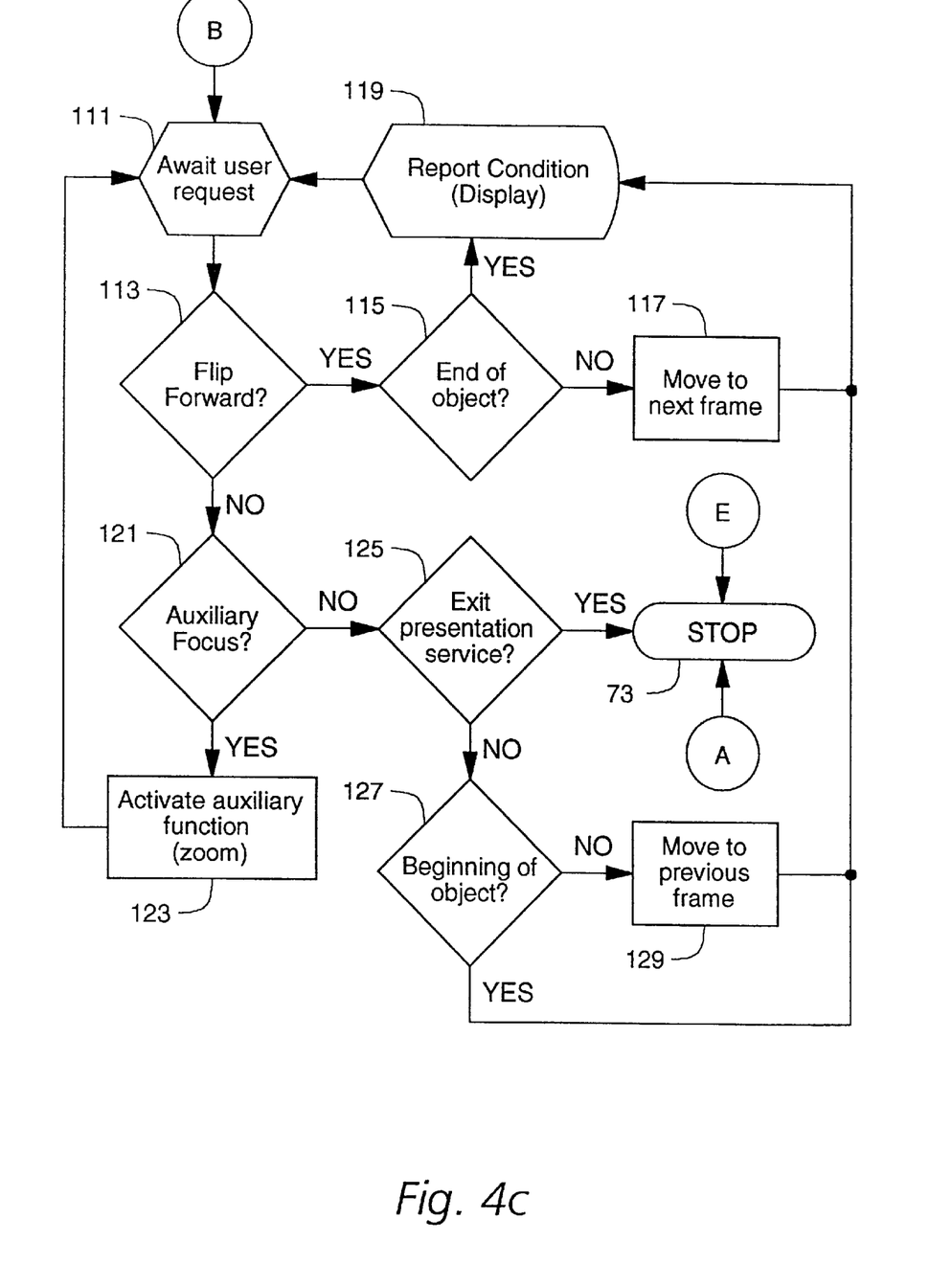

In general, the method of FIGS. 4a–4c processes the object so that when the object is passed to the presentation device 17, the object will be presented in accordance with its attributes. In this manner, the object can be presented by a wide variety of presentation devices, independently of the unique characteristics of those presentation devices. First, the method determines if the object should be displayed to the audience. If not, as in the case of inadvertently dropping the phone icon 37 onto the projector icon 17A, then display is prevented and the user is notified. If the object is unrestricted for display, then the method determines what presentation device will display the object, and if the object is of a displayable type. The object is then transformed into a displayable type. If the object is to be displayed in a segmented format, then the method formats the object into displayable segments and the segments are displayed temporally with either automatic or manual control.

Figure 3:
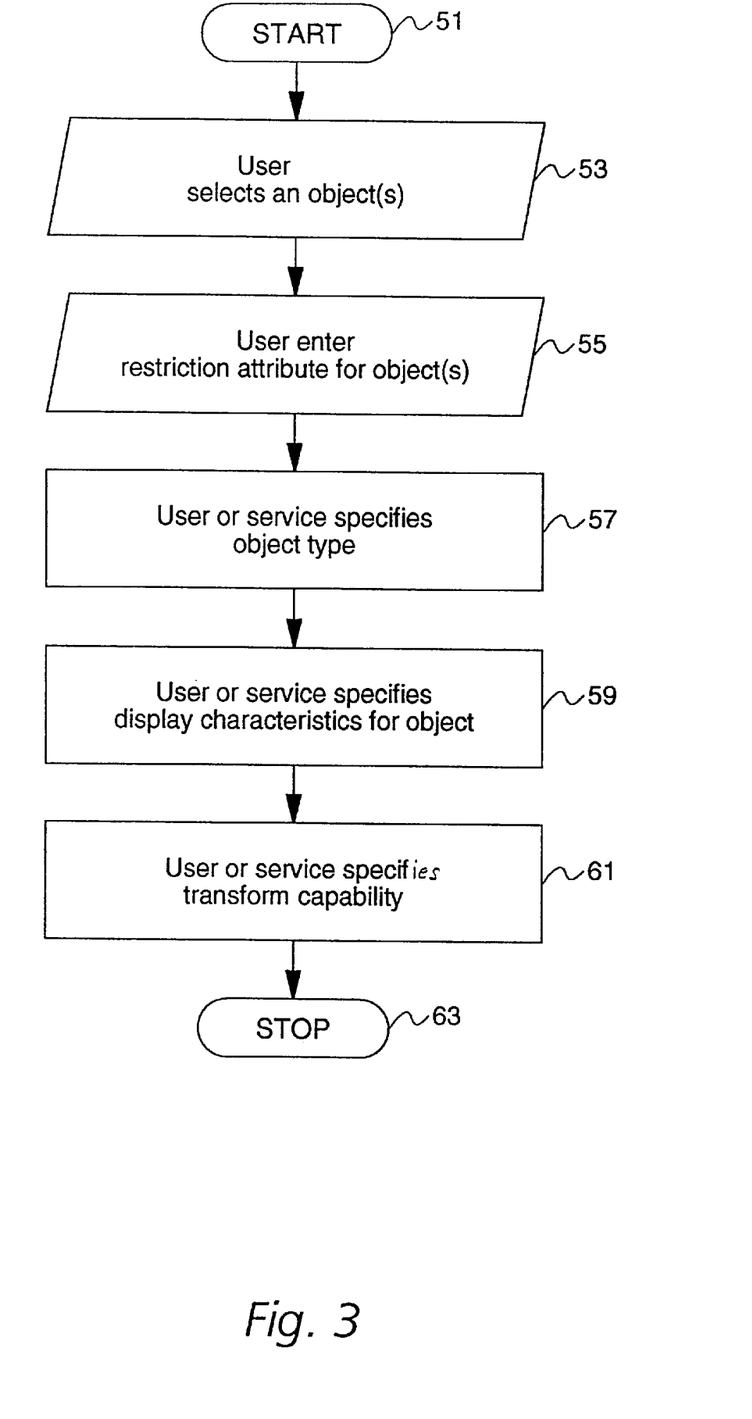
FIG. 3 shows the registration method or service for objects which are to be presented on a presentation device.

Referring now to FIGS. 3–4c, the specifics of the flow charts will be discussed. In the flow charts, the following graphical conventions are observed: a rectangle for either a process or function, a display symbol for a screen display, a diamond for a decision and a pentagon and a circle for off page connectors. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

Referring to FIG. 3, the registration of objects will be described. The method starts, step 51, when invoked by the user. In step 53, the user selects which object or objects that the user wishes to register. In step 55, the user enters the restriction attribute for each selected object. The restriction attribute determines if the object is to be displayed by the invention. This attribute is stored in a Restriction Table. The Restriction Table is a storage area that contains attributes of the availability of objects to be displayed. In step 57, either the user or the method itself specifies the object type. The object type is used to determine if the object is displayable. A displayable object is one that can be transformed into a displayable format, for example a binary bit image. In step 59, either the user or the method specifies display characteristics for the object. The display characteristics include which video adapter or adapters the object should be sent to (which information is stored in the Video Adapter Router Table), whether the object will be segmented into plural frames, whether the displayed frames be flipped manually or automatically and if automatically, the timing interval for displaying each frame. In step 61, either the user or the method specifies the transform capability of the object. The transform capability is an attribute that provides information on transforming the object into pages or into a single image. Also, the transform needed to display the object is registered as an attribute. In step 63, the method stops.

After the objects have been registered using the method of FIG. 3, presentation of the objects can proceed. As described above, presentation of an object occurs when the object is associated with the presentation device, such as by dropping the object icon onto the presentation device icon. This user action initiates the method of FIGS. 4a–4c.

In FIG. 4a, the method starts, step 65. In step 67, the Restriction Table is accessed. The method determines if the object is restricted for display, step 69. This is done by referring to the Restriction Table. For example, if Chart A is dropped onto the projector icon 17A, then the listing for Chart A in the Restriction Table is examined to determine if Chart A is restricted. If the result of step 69 is YES, the object is restricted for display, then the restricted condition is reported to the user on the computer screen 13, step 71, and the method stops, step 73 (see FIG. 4c). Alternatively, the error condition could be reported by an audio signal.

If, however, the result of step 69 (see FIG. 4a) is NO, the object is not restricted for display, then the Video Adapter Router Table is accessed, step 75. In step 77, the method determines if the object can be routed to an adapter. This is done by determining from the Video Adapter Router Table if the object has been registered to one or more particular adapters. If the result of step 77 is NO, then the condition is reported to the operator on the computer screen 13, step 79 (see FIG. 4b). The method stops, step 73 (see FIG. 4c).

If the result of step 77 (see FIG. 4a) is YES, the object can be routed to an adapter, then the method proceeds to step 81 (see FIG. 4b), where a request to project the object is input. Step 81 is used as a confirmation to project the object. The confirmation can be input by the user. Alternatively, the confirmation can be provided by default.

Next, in step 83, the method determines if the object is of a displayable type. This is determined from the object type attributes associated with the object.

If the result of step 83 is NO, then the method determines if a transform exists for the object, step 85. A transform converts the object into a presentable format suitable for the presentation device. If the result of step 85 is NO, then the object cannot be displayed and the condition is reported, step 79. However, if the result of step 85 is YES, a transform does exist for the object, then in step 87 the object is transformed into a presentable format. In step 89, the transformed image is scaled to the size of the frame which is to be displayed. Then, in step 91, the transformed object or image is projected to the media or presentation device. For example, if Chart A 27A of FIG. 2 was the object dropped onto the projector icon 17A, then the Chart 27 would be displayed on the projector screen 21 as shown in FIG. 1. After step 91, the method stops, step 73 (see FIG. 4c). Dropping another object onto the projector icon 17A restarts the method of FIGS. 4a–4c.

If the result of step 83 is YES, the object is of a displayable type, then the method determines if the object is to be converted from page to image to frames, step 93. This step determines if the object is to be segmented into portions, with each portion being displayed one at a time. For example, on a multipage word processing document, it may be desirable to display only one page at a time. If so, then each page is transformed into a binary image, which is presented as a single frame on the screen. Displaying all of the pages at once could make the document unreadable due to the small size of the characters. Whether to convert the pages to frames is determined from the object attributes. To allow the object to be paginated during display, so that smaller portions of the object can be displayed, the object is registered as having a displayable type, to produce a YES from step 83.

If the result of step 93 is NO, that is the entire object is to be displayed as a single frame, then the method proceeds to step 87 and the following steps, which have already been discussed.

If the result of step 93 is YES, then the object is to be segmented. First, the object is scanned to identify codes for the beginning and ends of pages, step 95. This step allows the method to identify the pages within the object. After scanning the object, the method, in step 97 (see FIG. 4*a*), determines if the object is empty. If YES, then the method proceeds to step 71 to report the condition.

If the result of step 97 is NO, then the first page is transformed to a binary image into a frame, step 99. Step 101 determines if the transformed page is at the end of the object. If NO, then the method gets the next page, step 103 and transforms it, step 99. If the result of step 101 is YES, wherein all of the pages of the object have been transformed, then the method proceeds to step 105.

In step 105, the method determines if the frames are to be displayed in a manually timed sequence. This is determined from the object attributes. If NO, then the frames will be displayed in an automatic timed sequence. In step 107, the timer profile is accessed. The time profile is an attribute of the object that was provided in the registration service of FIG. 3. In step 109, the frames are projected by the presentation device 17 according to the timer profile. The timer profile determines the timing sequence of displaying the frames. For example, each frame could be displayed for five seconds. After five seconds, the next frame is shown on the screen 21. After all of the frames have been displayed, the method stops, step 73.

If the frames are to be displayed with a manual timing sequence, then the result of step 105 is YES. The method then proceeds to step 111 (see FIG. 4*c*) to await a request from the user to change the display. Such a request could come from the keyboard 15 or other input device. The user can flip forward to the next frame, flip backward to the previous frame, zoom in (or out) on a portion of a frame, or exit to remove the object from the display.

In step 113, the method determines if the user request is to flip forward. If YES, then the method determines if there is another frame to flip to by determining if the end of the object has been reached, step 115. If NO, then the next frame is projected to the presentation device, step 117. The display condition is reported to user, step 119 and the method returns to step 111. If the result of step 115 is YES, the end of the object has been reached, then this condition is reported, step 119.

If the user request is not to flip forward, a NO is produced by step 113 and the method determines if the user request is for an auxiliary focus, such as zoom, step 121. If YES, then the auxiliary function is activated, step 123 and the method returns to step 111.

If the user request is not for auxiliary focus, a NO is produced by step 121. In step 125, the method determines if the user request is to exit the presentation service. If YES, then the method stops, step 73 and the object is no longer displayed.

If the request of step 125 is NO, then the user request is determined to be, by default, flip backward. In step 127, the method determines if the frame being displayed is at the beginning of the object. If YES, then a flip backward is not obtainable and the condition is reported, step 119. If NO, then the previous frame is projected to the presentation device 17, step 129. The display condition is reported, step 119.

The foregoing disclosure and the showings made in the drawings are merely illustrative of the principles of this invention and are not to be interpreted in a limiting sense.

What we claim is:

1. A method of presenting an object in a data processing system, said presentation being with a presentation device, said data processing system having a user interface that is separate from said presentation device, comprising the steps of:

a) displaying a representation of said object on said user interface;

b) providing said object with attributes that are relevant to the presentation of said object;

c) determining from an input provided by way of said displayed object representation on said user interface if said object is to be presented; and d) transforming said object into a displayable format in accordance with said attributes and providing said transformed object to said presentation device if said object is to be presented.

2. The method of claim 1 wherein said step of determining if said object is to be presented further comprises the steps of:

a) displaying a representation of said presentation device on said user interface of said data processing system; and b) determining if said object representation is associated with said presentation device representation.

3. The method of claim 1 wherein said step of providing said object with attributes that are relevant to the presentation of said object further comprises the step of providing said object with a restriction attribute, said restriction attribute further determining whether said object is to be presented if said input on said user interface indicates that said object is to be presented.

4. The method of claim 1 wherein said step of providing said object with attributes that are relevant to the presentation of said object further comprises the step of providing said object with a router attribute, said router attribute determining which presentation device or devices are to present said object.

5. The method of claim 1 wherein said step of providing said object with attributes that are relevant to the presentation of said object further comprises the step of providing said object with an object type attribute, said object type attribute determining whether said object is displayable by said presentation device.

6. The method of claim 1 wherein said step of providing said object with attributes that are relevant to the presentation of said object further comprises the step of providing said object with a segmentation attribute, said segmentation attribute determining whether said object is to be segmented into plural segments for presentation.

7. The method of claim 6 wherein said step of providing said object with attributes that are relevant to the presentation of said object further comprises the step of providing said object with a sequential control attribute, said sequential control attribute determining if said object segments are to be presented in an automatically timed sequence or in a manually controlled sequence.

8. The method of claim 6 further comprising the step of displaying said segments by allowing a user to either present an unpresented segment or present a previously presented segment.

9. An apparatus for presenting an object in a data processing system, said data processing system having a user interface, comprising:
   a) mean for displaying a representation of said object on said user interface;
   b) a presentation device for presenting said object, said presentation device being in communication with said data processing system and being separate from said user interface;
   c) means for providing said object with attributes that are relevant to the presentation of said object;
   d) means for determining if said object is to be presented based on an input provided by way of said user interface; and
   e) means for transforming said object into a displayable format in accordance with said attributes and means for providing said transformed object to said presentation device if said object is to be presented.

10. The apparatus of claim 9 wherein said means for determining if said object is to be presented further comprises:
   a) means for displaying a representation of said presentation device on said user interface of said data processing system; and
   b) means for determining if said object representation is associated with said presentation device representation.

11. The apparatus of claim 9 wherein said means for providing said object with attributes that are relevant to the presentation of said object further comprises means for providing said object with a restriction attribute, said restriction attribute determining whether said object is to be presented if said input on said user interface indicates that said object is to be presented.

12. The apparatus of claim 9 wherein said means for providing said object with attributes that are relevant to the presentation of said object further comprises means for providing said object with a router attribute, said router attribute determining which presentation device or devices are to present said object.

13. The apparatus of claim 9 wherein said means for providing said object with attributes that are relevant to the presentation of said object further comprises means for providing said object with an object type attribute, said object type attribute determining whether said object is displayable by said presentation device.

14. The apparatus of claim 9 wherein said means for providing said object with attributes that are relevant to the presentation of said object further comprises means for providing said object with a segmentation attribute, said segmentation attribute determining whether said object is to be segmented into plural segments for presentation.

15. The apparatus of claim 14 wherein said means for providing said object with attributes that are relevant to the presentation of said object further comprises means for providing said object with a sequential control attribute, said sequential control attribute determining if said object segments are to be presented in an automatically timed sequence or in a manually controlled sequence.

16. The apparatus of claim 14 further comprising means for displaying said segments by allowing a user to either present an unpresented segment or present a previously presented segment.

17. A method of presenting an object in a data processing system, said presentation being with a presentation device, comprising the steps of:
   a) providing said object with attributes that are relevant to the presentation of said object, said attributes comprising a transform attribute;
   b) determining if said object is to be presented;
   c) determining from said transform attribute if said object is to be transformed from a non-displayable format into a format displayable upon said presentation device, if said object is to be presented;
   d) transforming said object from a non-displayable format into a format displayable upon said presentation device if said object is to be transformed.

18. An apparatus for presenting an object in a data processing system, said presentation being with a presentation device, comprising:
   a) means for providing said object with attributes that are relevant to the presentation of said object, said attributes comprising a transform attribute;
   b) means for determining is said object is to be presented;
   c) means for determining from said transform attribute if said object is to be transformed from a non-displayable format into a format displayable upon said presentation device, if said object is to be presented;
   d) means for transforming said object from a non-displayable format into a format displayable upon said presentation device if said object is to be transformed.

* * * * *